United States Patent
Lannutti et al.

(10) Patent No.: US 8,905,879 B2
(45) Date of Patent: Dec. 9, 2014

(54) DEFLECTED BEARING SHIELD AS A BEARING SEAL FOR A PULLEY ASSEMBLY AND METHOD OF ASSEMBLY

(75) Inventors: Anthony E. Lannutti, Fayetteville, AR (US); Robert J. Crist, Benton County, AR (US); Matthew J. Leis, Bentonville, AR (US)

(73) Assignee: Dayco IP Holdings, LLC, Springfield, MO (US)

( * ) Notice: Subject to any disclaimer, the term of this patent is extended or adjusted under 35 U.S.C. 154(b) by 542 days.

(21) Appl. No.: 12/539,104

(22) Filed: Aug. 11, 2009

(65) Prior Publication Data
US 2011/0039648 A1    Feb. 17, 2011

(51) Int. Cl.
F16H 55/36    (2006.01)
F16C 33/76    (2006.01)
F16C 13/00    (2006.01)
F16C 33/78    (2006.01)

(52) U.S. Cl.
CPC ............ F16C 33/76 (2013.01); F16C 2361/63 (2013.01); F16C 13/006 (2013.01); F06C 33/7886 (2013.01); F16C 33/7896 (2013.01)
USPC ............................ 474/166; 384/481; 384/482

(58) Field of Classification Search
CPC .... F16C 13/006; F16C 2361/63; F16C 33/76; F16C 33/7886; F16C 33/7896
USPC .................... 474/166; 384/481, 482
See application file for complete search history.

(56) References Cited

U.S. PATENT DOCUMENTS

| | | | |
|---|---|---|---|
| 1,787,459 A * | 1/1931 | Tawresey | 384/481 |
| 2,747,687 A | 5/1956 | Carter | |
| 3,177,020 A | 4/1965 | Dumpis | |
| 3,494,681 A * | 2/1970 | Anderson et al. | 384/482 |
| 3,519,316 A | 7/1970 | Göthberg | |
| 3,792,912 A * | 2/1974 | Howe et al. | 384/482 |
| 3,869,181 A * | 3/1975 | Barber | 384/482 |
| 3,899,226 A * | 8/1975 | Frost et al. | 384/480 |
| 4,025,132 A | 5/1977 | Watanabe | |
| 4,384,387 A * | 5/1983 | Pachuta | 16/107 |
| 4,533,265 A | 8/1985 | Woodbridge | |

(Continued)

FOREIGN PATENT DOCUMENTS

CN   201209628   3/2009
JP   116054/90   9/1990

OTHER PUBLICATIONS

PCT, International Search Report and Written Opinion, International Application No. PCT/US2010/044943 (Oct. 1, 2010).

(Continued)

*Primary Examiner* — Henry Liu
(74) *Attorney, Agent, or Firm* — Thompson Hine L.L.P.

(57) ABSTRACT

Disclosed is a pulley assembly including a pulley having an axis of rotation a pulley shell, and a bearing; a shaft having a pulley-receiving end that receives the pulley; and a first bearing shield disposed at the pulley-receiving end of the shaft. The pulley shell includes an annular wall that defines an opening for housing the bearing. The bearing is housed therein and has an inner race, outer race, and a rolling element. The first bearing shield includes a deflected sealing member biases against at least one of the outer race of the bearing and the pulley shell as a first contact seal to protect the bearing from contaminants.

6 Claims, 7 Drawing Sheets

(56) References Cited

U.S. PATENT DOCUMENTS

| | | | |
|---|---|---|---|
| 4,592,666 A | | 6/1986 | Jornhagen |
| D285,247 S | | 8/1986 | Jornhagen |
| 4,687,349 A | * | 8/1987 | Pachuta ............... 384/477 |
| 4,755,067 A | * | 7/1988 | Asberg et al. ............ 384/482 |
| 4,916,750 A | | 4/1990 | Scott |
| 5,005,992 A | * | 4/1991 | Dreschmann et al. ...... 384/484 |
| 5,172,917 A | | 12/1992 | du Gay |
| 6,575,860 B2 | | 6/2003 | Dutil |
| 6,854,893 B2 | * | 2/2005 | Schmidt ............... 384/486 |
| 2005/0026729 A1 | * | 2/2005 | Schenk et al. ............ 474/101 |
| 2006/0188190 A1 | * | 8/2006 | Schmidl et al. ............ 384/477 |
| 2009/0286636 A1 | | 11/2009 | Serkh et al. |

OTHER PUBLICATIONS

Australian Application No. 2010282696, Patent Examination Report No. 1, Jul. 30, 2013.

Chinese Application No. 201080035396.3, Notification of the First Office Action, May 28, 2013.

CA, Examination Report, Canadian Patent Application No. 2,766,928 (Dec. 3, 2013).

JP, Notice of Reason(s) for Rejection (English translation), Japanese Patent Application No. 2012-524778 (Nov. 26, 2013).

KR, Grounds for Rejection (with English Translation), Korean Patent Application No. 2012-7001279 (Oct. 28, 2013).

* cited by examiner

DEFLECTED BEARING SHIELD AS A BEARING SEAL FOR A PULLEY ASSEMBLY AND METHOD OF ASSEMBLY

TECHNICAL FIELD

The present invention relates generally to a bearing shield for a pulley to protect an exposed side of a pulley's bearing from contaminants.

BACKGROUND

Pulleys such as drive pulleys (both front-side and back-side), idler pulleys, tensioner pulleys, and the like are frequently employed for automotive use, e.g. to drive or tension a belt of a drive system. The belt drive system can include a driver pulley and one or more idler pulleys and a belt trained around the belt surface of each of the various pulleys. The belt surface may be, for example, smooth, deep V-shaped, cogged or multi-ribbed.

In such automotive and other industrial applications, contaminants such as dust, sand, salt, and/or other foreign matter can find a way into the pulley's bearing. Bearings wear more quickly when left open to contaminants, thereby reducing the lifespan of the bearing. Contaminants can also cause the ball or rolling element to make excessive noise or even seize up. Seizing can cause the driving belt to break or fall off as a result of the belt sliding on a locked pulley.

A bearing seal is a first line of defense against contaminants, but is often not enough. Additional seals or sealing methods are often used to improve the defense against contaminants, like those described in U.S. Pat. No. 4,916,750, U.S. Pat. No. 3,177,020, and U.S. Pat. No. 2,747,689 directed to double seals. These double seals, however, are included in the bearing, rather than as an external seal.

Conventional labyrinth seals are one example of an external seal or bearing shield that reduces the amount of contaminants reaching the bearing. The problem with a labyrinth seal is that they still provide an open pathway underneath the seal, regardless of how small the pathway, for contaminants to reach the bearing.

Other seal designs utilize bearing shields that are pressed into the bore of the pulley that houses the bearing. One problem with such designs is the difficulty of installation, which typically requires a special tool to press the bearing shield into the bore. Additionally, the bore requires tight tolerances for securely retaining the bearing shield, which may be difficult to manufacture consistently. These aforementioned seal designs are not ideal.

Accordingly, it is desired to have a bearing shield that improves the defense against contaminants, while also being easier to install and/or manufacture.

SUMMARY

One aspect of a pulley assembly is disclosed herein to protect the bearing within a pulley shell from contaminants. The pulley assembly includes a pulley having an axis of rotation, a pulley shell, and a bearing; a shaft having a pulley-receiving end for receiving the pulley; and a first bearing shield disposed at the pulley-receiving end of the shaft. The pulley shell includes an annular wall that defines an opening to house the bearing. The bearing is housed therein, and includes an inner race, outer race, and a rolling element between the races.

The first bearing shield includes a deflected sealing member biases against at least one of the outer race of the bearing and the pulley shell as a first contact seal to protect the bearing from contaminants.

In one embodiment, the first bearing shield includes a self-deflecting plate having the deflected sealing member about the outer periphery of the self-deflecting plate. In another embodiment, the first bearing shield includes a cup coupled to the deflected sealing member to position the deflected sealing member against at least one of the outer race of the bearing and the pulley shell. In another embodiment, the first bearing seal is a V-ring.

The pulley assembly may include a second bearing shield disposed on the opposite side of the pulley from the first bearing shield or between the bearing and a fastener that attaches the pulley and bearing shields to the shaft. The second bearing shield may be a traditional bearing shield or may be similar to any embodiment of the first bearing shield.

In another aspect, a method for assembling the pulley assembly includes providing a pivot shaft defining an axis of rotation and having a pulley-receiving end, positioning a first bearing shield disposed at the pulley-receiving end of the pivot shaft, positioning a pulley on the pivot shaft for rotation about the axis. The pulley includes a pulley shell having an annular wall housing a bearing that has an inner race, an outer race, a rolling element therebetween. The first bearing shield includes a deflected sealing member biased against at least one of the outer race of the bearing and the pulley shell as a first contact seal. The method may also include attaching the pulley and first bearing shield to the pivot shaft. Alternately, the method may include positioning a second bearing shield over the upper surface of the bearing opposite the first bearing shield and attaching the pulley, the first bearing shield, and the second bearing shield to the pivot shaft.

DETAILED DESCRIPTION

Figure 1:
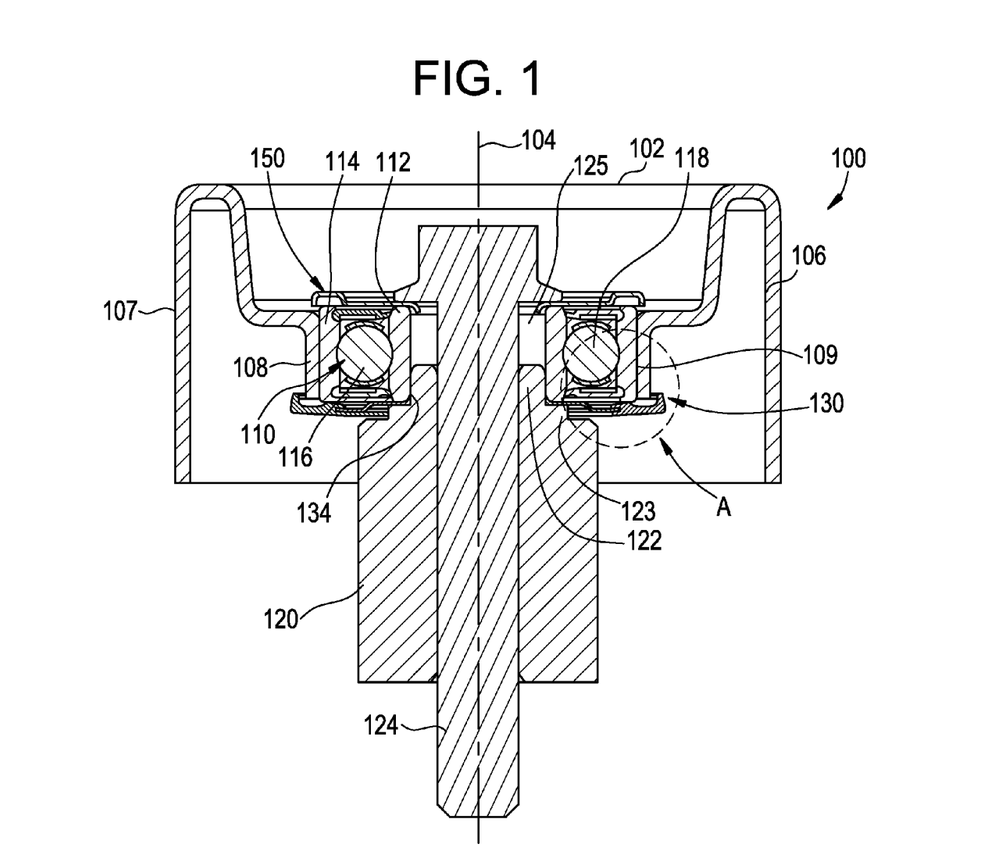
FIG. 1 is a front, cross-sectional view of a first embodiment of a pulley assembly.
Figure 2:
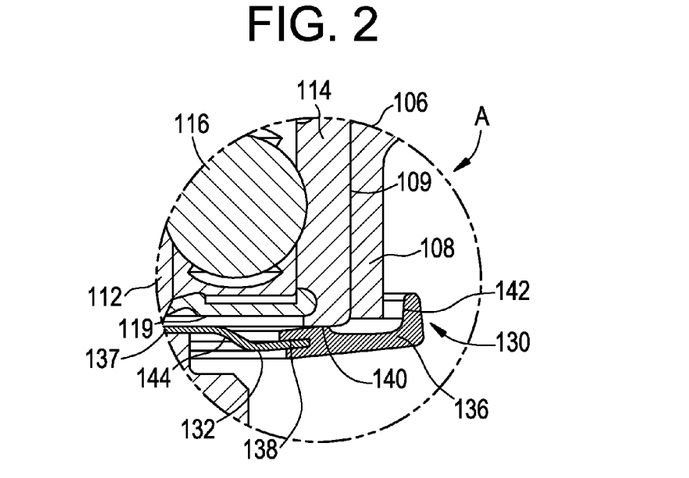
FIG. 2 is an enlarged view of the portion of the first bearing shield inside circle A of FIG. 1.

Referring now to the embodiment shown in FIGS. 1 and 2, a pulley assembly, generally designated 100, is shown that includes a pulley 102 having an axis of rotation 104, a shaft 120 having a pulley-receiving end 121 for seating the pulley thereon, a first bearing shield 130, an optional second bearing shield 150, and a fastener 124. The pulley-receiving end 121 of shaft 120 includes a pulley hub 122 about which the pulley rotates and a mounting base 123. Generally, the pulley 102 and the shaft 120 contain an aperture shaped to engage a fastener, such as a bolt to provide a clamping force and to aid in securing components of the pulley assembly together. As appreciated by one skilled in the art, the fastener 124 may also be a screw, pin, rivet, or other fasteners capable of providing the clamping force. The aperture in the pulley is typically centrally located and passes through a bearing 110 housed within an opening 109 within the pulley 102.

The pulley 102 may be an idler pulley used with a drive belt system to drive an accessory or as a component of a belt tensioner to change the direction of the belt or to maintain the belt's tension, but is not limited thereto. In some instances, the pulley may serve as a wheel, gear, roller or the like.

Pulley 102 includes a pulley shell 106 and a bearing 110. Pulley shell 106 includes an annular wall 108 that defines an opening 109 for housing the bearing 110. The pulley shell 106 may include a belt running surface 107 that can be generally, but not limited to, smooth, textured, or ribbed, such as V-ribbed. One of skill in the art will appreciate that the pulley shell may be of any design, including a shell having a core that may include ribs or differing materials from other parts of the pulley shell. The pulley shell may be molded or non-molded and may be a plastic or other suitable material.

Bearing 110 is housed within opening 109 defined by the annular wall 108 of the pulley shell 106. The bearing includes an inner race 112, an outer race 114, a rolling element 116 therebetween, and has an upper and a lower surface 118, 119, respectively. In the pulley assembly shown in FIG. 1, the upper and lower surfaces 118, 119 are both exposed and vulnerable to contaminants without the first and the second bearing shields 130, 150 present. The outer race 114 is adjacent the annular wall 108 and the inner race 112 defines the aperture that receives fastener 124 and receives the pulley hub 122 on the pulley receiving end 121 of shaft 120. The inner race of the bearing 112 will seat on mounting base 123 of the pulley-receiving end 121 of shaft 120.

First bearing shield 130 is disposed at the pulley-receiving end 121 of shaft 120. The first bearing shield 120 is generally positioned between the pulley-receiving end 121 and the lower surface of the bearing 119 to prevent or reduce contaminants entering the bearing. The first bearing shield includes a self-deflecting plate 132 having an opening 134 (shown more clearly in an alternate embodiment in FIGS. 4A-4B as opening 234) and deflected sealing member 136 about the outer periphery 138 of the self-deflecting plate 132. The self-deflecting plate 132 biases at least a portion of the deflected sealing member 136 against the outer race 114 of bearing 110 (see FIGS. 1 and 2), the annular wall 108 of pulley shell 106 (see FIG. 7), or any other portion of the pulley shell 106, or any combination thereof as a first contact seal 140 (FIG. 2). The embodiments shown in FIGS. 1-11 illustrate open cup style pulley shell, but the deflected sealing member 136 may be used with any style of pulley, such that the deflected sealing material may form a contact seal against the core or other portion of a solid pulley.

Opening 134 may be located generally in the center of self-deflecting plate 132 and enables the inner periphery 137 of the self-deflecting plate 132 to be seated on the mounting bases 123. As seen in FIG. 1, the inner race 112 applies an axial force to the inner periphery 137 of the first bearing shield 130 as transferred thereto by fastener 124 to hold the bearing shield 130 in place against the pulley receiving end 121 even when the pulley rotates, i.e., the inner periphery 137 is sandwiched between the pulley receiving end 121 and the inner race 112. The inner periphery 137 of the self-deflecting plate 132 may be recessed slightly to seat the bearing shield 130 more securely between the pulley-receiving end 121 and the inner race 112.

The self-deflecting plate 132 may be a spring plate. The spring plate may be self-deflecting and may be metal. In alternate embodiments, the spring plate may be any wear grade plastic, particularly such as a high temperature wear grade plastic Nylon 6/6, Nylatron GS, or rubber materials such as 60 Buna, or 60 Carboxylated Buna. As shown in FIG. 2, the spring plate may include a spring bend 144 that makes the plate self-deflecting to bias at least a portion of the deflected sealing member 136 against the outer race 114 as a contact seal 140. The self-deflecting plate 132 is advantageous in that it continues to bias the deflected sealing member 136 against the outer race 114 even as the sealing material thins as a result of friction. Another advantage of this design is that spring bend 144 may be tailored to enhance or reduce the deflecting member's biasing force to change the characteristics of the contact seal to account for variations in pulley designs.

The self-deflecting plate 132 and the deflected sealing member 136 may be one piece or may be separate components connected together. The deflected sealing member 136 may be comprised of a sealing material that is wear resistant, flexible, self-deflecting, or any combination thereof. For example suitable sealing material include high temperature wear grade plastic, such as Nylon 6/6, Nylatron GS, or rubber materials such as 60 Buna, or 60 Carboxylated Buna.

Figure 3:
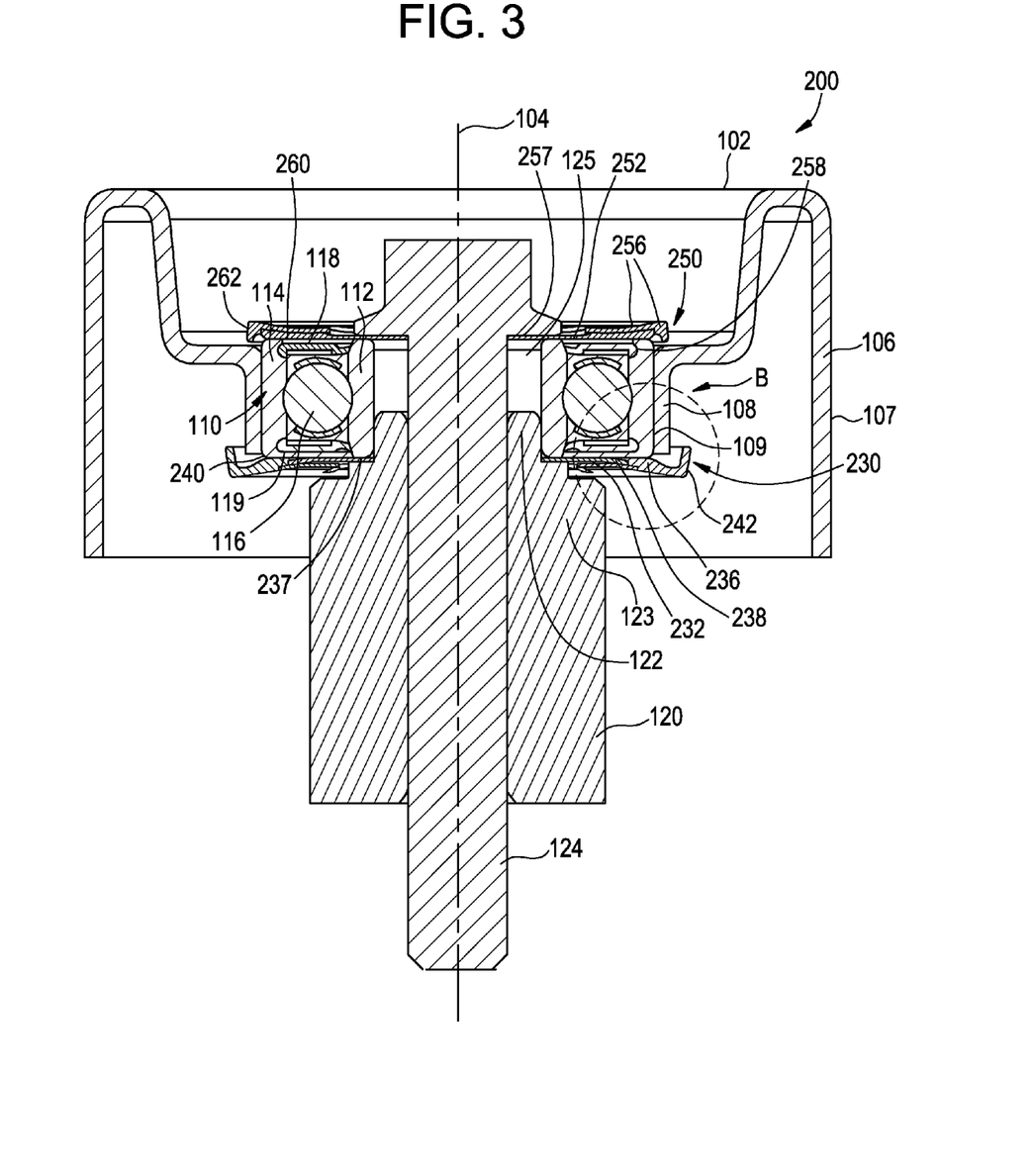
FIG. 3 is a front, cross-sectional view of a second embodiment of a pulley assembly.
Figure 4A:
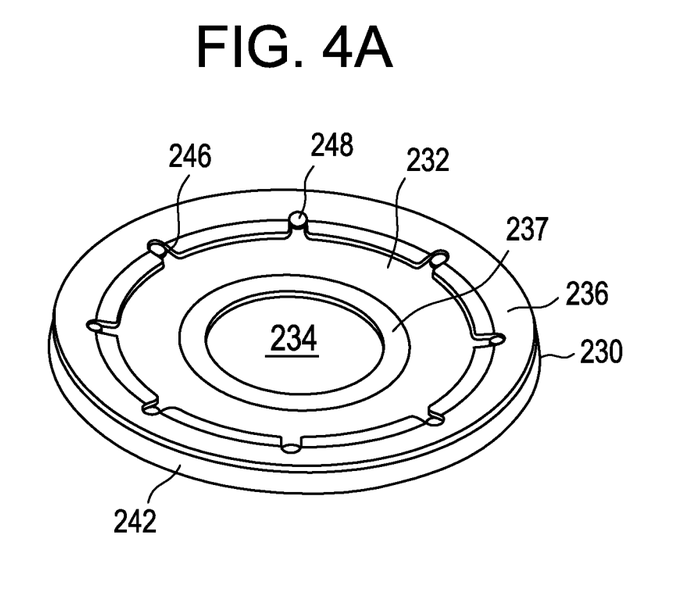
FIGS. 4A and 4B are enlarged top and bottom views, respectively, of the first bearing shield of FIG. 3.
Figure 4B:
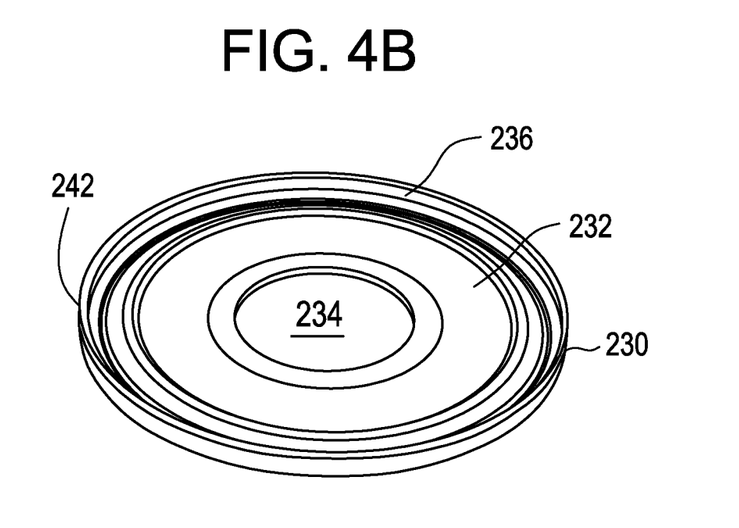

In one embodiment, the sealing material may be integrally molded with, or co-molded with the outer periphery of the deflecting member using techniques well known in the art, such as over-molding. As shown in FIG. 2, the deflected sealing member 136 may be a generally disc-shaped body that extends generally about the same distance over the upper and lower surfaces of the outer periphery 138 of the deflecting member. Alternately, as shown in FIGS. 3 and 4A-4B, the deflected sealing member 236 may extend over more of the upper surface of the deflecting member relative to the lower surface. The mold may be designed such that the deflected sealing member 136 has about the same thickness above and below the deflecting member, similar to FIGS. 1-2. However, the molds may be designed to provide more (i.e., thicker) sealing material below the deflecting member, similar to FIGS. 3-6, or above the deflecting member to position the outer periphery off 138 closer to the upper or lower surface of the sealing material, respectively. The position of the outer periphery relative to the thickness of the sealing material can enhance or reduce the deflecting member's biasing force and therefore can be utilized to change the characteristics of the contact seal.

The deflected sealing member 136 may be continuous or discontinuous about the outer periphery 138. Continuous sealing material is likely to provide a better defense against contaminants. The deflected sealing member 136 may be any suitable material for forming a contact seal 140 against the outer race 114 of the bearing 110 and/or the annular wall 108 of the pulley shell 106.

Figure 6:
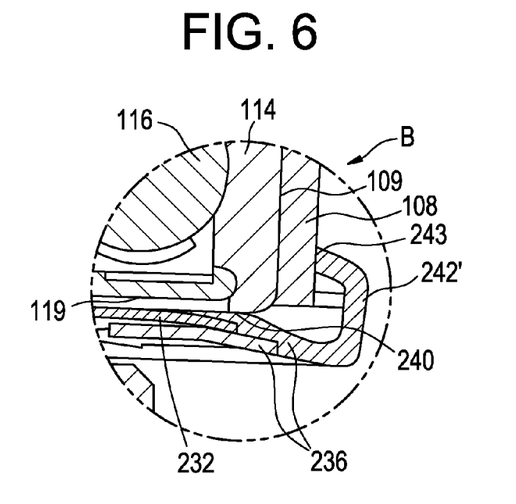
FIG. 6 is an enlarged view of a portion of the first bearing shield inside circle B of FIG. 3 showing an alternate flange design.

Deflected sealing member 136 may include flange 142 extending generally parallel to the axis of rotation 104 from the outer periphery of the deflected sealing member 136 such that the flange 142 overhangs the annular wall 108 of the pulley shell 106. The flange as shown in FIGS. 1 and 2 overhangs the annular wall without contact therewith, thereby creating a secondary labyrinth seal. In another embodiment, the flange may generally curve back toward the annular wall of the pulley shell, as shown in FIG. 6, to provide a smaller opening so it is harder for contaminants to travel up under the flange or to contact the annular wall 108 to form a secondary contact seal 243. The flanges in any of the embodiments herein are adaptable to various pulley shell designs, i.e., the flange may be any configuration or shape to overhang or extend beyond the outer race of the bearing or a portion of the pulley shell closest to the upper surface of the bearing, with or without contact therewith.

Still referring to FIG. 1, the pulley assembly 100 may include a second bearing shield 150 disposed between the upper surface 118 of the bearing 110 and a portion of the fastener extending beyond aperture 125, such as the head of a pulley bolt. The second bearing shield 150 may be any conventional seal, for example, a labyrinth seal as shown in FIG. 1. Alternately, the second bearing shield 150 may be similar to any embodiment of the first bearing shield described herein, including the cup design in FIGS. 7-9 if the pulley shell's configuration is modified to accommodate the cup design.

Referring now to FIG. 3, a pulley assembly, generally designated 200, is shown that includes alternate embodiments for the first bearing shield 230 and the second bearing shield 250, otherwise the other components and features are the same as FIG. 1 and are numbered accordingly.

The first bearing shield 230 is disposed in the same position as described for the first bearing shield of FIG. 1. First bearing shield 230, as shown in FIGS. 3 and 4A-4B, includes a self-deflecting plate 232 having an opening 234 defined by the inner periphery 237, as described above, and deflected sealing member 236 about the outer periphery 238 of the deflecting member. A portion of the inner periphery 237 may be recessed slightly to seat the bearing shield 230 more securely against the pulley-receiving end 121. The deflected sealing member 236 extends over more of the upper surface than the lower surface of the self-deflecting plate 232 and the sealing material on the upper surface includes one or more slots 246 that mate with protrusions 248 on the upper surface of the self-deflecting plate 232. The plastic material that is molded over the deflected member 232 may contain slots 248 in the deflected sealing member 236 to allow for diametrical expansion once the bearing shield 230 has been deflected. Slots 248 help prevent cracking in the deflected sealing member 236. The sealing material may include flange 242 that overhangs the annular wall 108 without contact therewith or flange 242' (FIG. 6) that overhangs and contacts the annular wall to form a secondary contact seal 243.

Figure 5A:
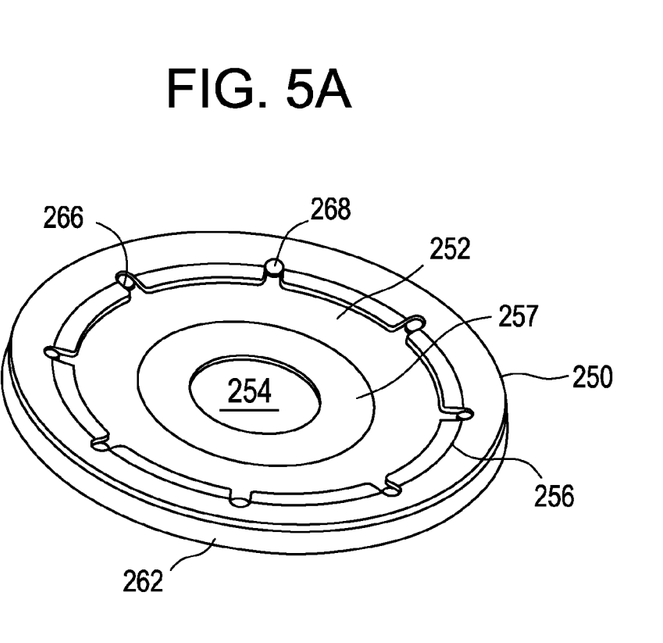
FIGS. 5A and 5B are enlarged top and bottom views, respectively, of the second bearing shield of FIG. 3.
Figure 5B:
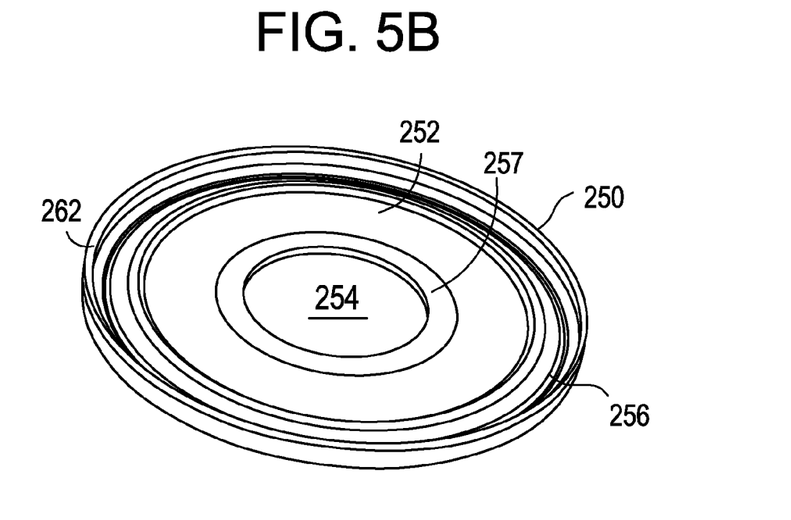

The second bearing shield 250, shown in FIGS. 5A-5B, includes a self-deflecting plate 252 having an opening 254 defined by the inner periphery 257, as described above, and deflected sealing member 256 about the outer periphery 258 of the deflecting member. A portion of the inner periphery 257 may be recessed slightly to seat the bearing shield 250 more securely between the bearings upper surface 118 and the fastener 124. Second bearing shield 250 is similar in structure to the first bearing shield 230, but is dimensionally proportioned to cover the upper surface 118 of the bearing 110 and/or to overhang or form a contact seal with the outer race 114 of bearing 110 or the portion of the pulley shell 106 that is adjacent the outer race. Like the first bearing shield 230, the second bearing shield 250 may have the deflected sealing member 256 extending over more of the upper surface than the lower surface of the self-deflecting plate 252 and may include a flange 262. The deflected sealing member 256 may include slots 266 that mate with protrusions 268 on the upper surface of the self-deflecting plate 252 similar to those described for first bearing shield 230.

The deflecting members and the sealing members of both the first and the second bearing shields 230, 250 may be one piece or may be separate components connected together, as described above. In both embodiments, the deflecting member is shown as a generally flat plate that may be a metal plate or washer. Alternately, the plate may be any of the other materials described above. The deflected sealing member 236 and 256 shown in FIGS. 4A-4B and FIGS. 5A-5B, respectively, are over-molded onto the outer periphery of the deflecting member as a continuous generally disc-shaped member, but may be connected by other alternate methods.

As shown in FIG. 3, both the first and the second bearing shields 230, 250 have the outer periphery of the deflecting member disposed in the sealing material such that the thickness of the sealing material under the plate that will form the contact seal is greater than the thickness of the sealing material above the plate, i.e., is "off-center" as shown in the cross-section. Since the plate is generally flat and positioned off-center within the sealing material, when the fastener 124 applies an axial force on the inner periphery of either or both deflecting members 232, 252, the axial force causes the plate to deflect the outer periphery 238, 258 axially toward the bearing, thereby biasing the sealing material into contact with the outer race 114 of bearing 110 to form contact seals 240 and 260, respectively. The contact seal will last longer if formed with the thickest portion of sealing material on the underside of the deflecting material.

Still referring to FIG. 3, flanges 242 and 262 extend from the outer periphery of the general disc-shaped body of sealing material of the first and second bearing shields 230, 250. The general disc-shaped body may be configured so the flange is disposed beyond the contact seal 240 or 260, and may overhang the outer race 114 of bearing 110, the annular wall 108 of pulley shell 106, and/or the portion of the pulley shell adjacent the outer race. Flange 242 does not contact the annular wall 108 and flange 262 does not contact the portion of the pulley shell adjacent the outer race 114. The flanges 242, 262 thereby create a secondary labyrinth seal as an additional defense against contaminants.

Referring now to FIG. 6, which shows an enlarged view of the portion of the second bearing shield inside circle B in FIG. 3, an alternate flange design 242' is shown. Flange 242' extends from the deflected sealing member 236 and overhangs the annular wall 108 and curves back toward the annular wall for contact therewith as a secondary contact seal 243 in addition to the first contact seal 240. One of skill in the art will appreciate that the flange can be designed to have numerous variations in shape, but what is important is that the flange contacts another surface of the pulley to provide the secondary contact seal. This alternate flange design may also be applicable to the first bearing shield 250 if compatible with the design of the pulley shell.

Figure 7:
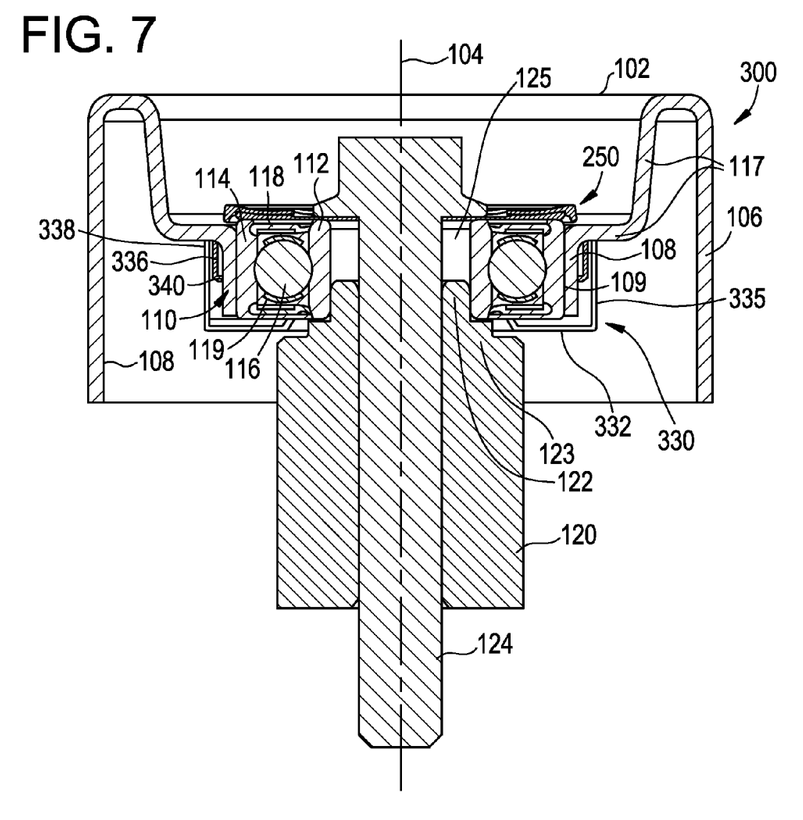
FIG. 7 is a front, cross-sectional view of a third embodiment of a pulley assembly.

Referring now to FIG. 7, a pulley assembly, generally designated 300, is shown that has an alternate embodiment for the first bearing shield 230, otherwise the other components and features are the same as FIGS. 1 and 3 with corresponding reference numbers. First bearing shield 330 forms a first contact seal 340 between the deflected sealing member 336 and the annular wall 108 of the pulley shell 106 rather than against the lower surface 119 of bearing 110, specifically the outer race 114. While the deflected sealing member 336 is shown on an interior wall of cup 332, it may alternately be on the outside wall of the cup or cover the rim 338 such that the contact seal may be formed against at least one of the core walls 117 or the outer annular wall 108'. In another embodiment, if the annular wall 108 was shorter or had openings that exposed the outer race 114 adjacent to the annular wall 108, the deflected sealing member 336 could contact the surface of the outer race to form contact seal 340. If the pulley shell is a solid body, then the deflected sealing member may contact any portion of the pulley shell to form the contact seal or even fit into a groove formed in the pulley shell.

Figure 8:
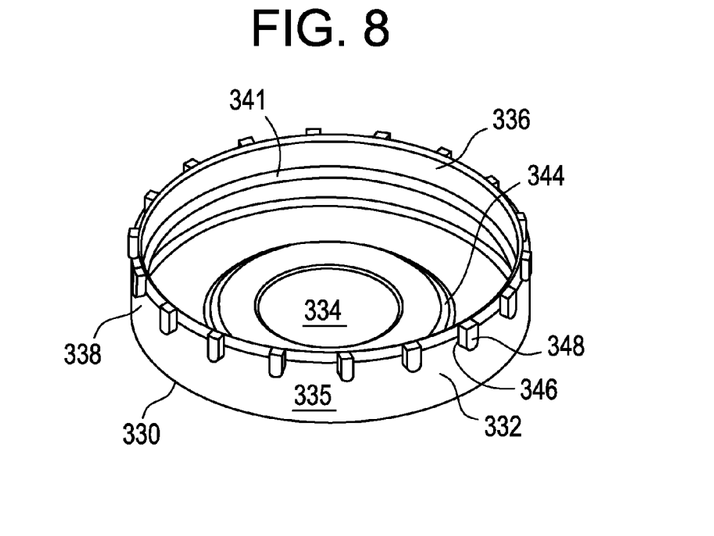
FIG. 8 is an enlarged perspective view of the first bearing shield of FIG. 7.
Figure 9:
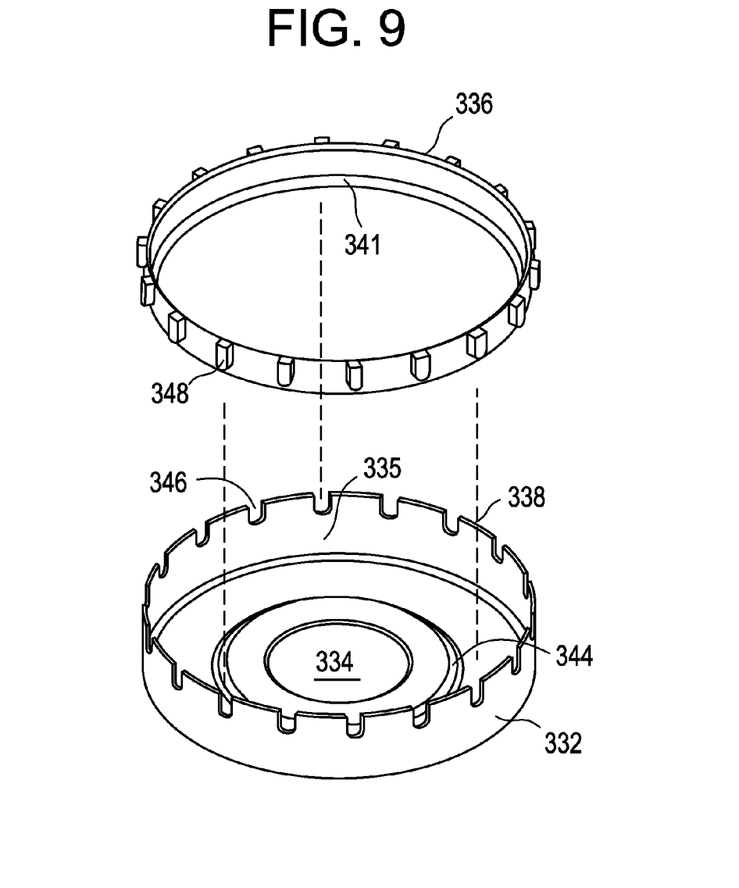
FIG. 9 is an exploded view of the first bearing shield of FIG. 8.

The first bearing shield 330, as shown in FIGS. 7-9, includes a cup 332 and deflected sealing member 336. While the cup 332 is shown as having a generally circular sidewall 335, the cup is not limited thereto. Cup 332 has an opening 334, similar to that described for the self-deflecting plate 132 above and a rim 338 that defines the outer periphery of the cup. Cup 332 is shaped to place at least a portion of the deflected sealing member 336 against the annular wall 108 as contact seal 340. The sealing material is deflectable into or against the annular wall 108. The rim 338 of the cup may include one or more slots 346 or other configuration to connect the deflected sealing member 336 to the cup 332.

Deflected sealing member 336 may be continuously or discontinuously disposed about the rim 338 of the cup 332 and may generally be shaped to mate with rim 338. At least a portion of the deflected sealing member 336 may line the inner circumference of the cup's wall 335 or walls. As shown in FIGS. 7-9, the sealing material is an annular ring that includes one or more protrusions 348 for mating with slots 346 in the rim 338 of the cup 332 to connect the sealing member and cup. The protrusions 348 and slots 346 may be a generally tight fit or a loose fit. Even a loose fit keeps the sealing material in place as a result of the assembly shown in FIG. 7, where there is no room for the sealing material to slip out from between the cup and the portion of the pulley shell adjacent to the annular wall.

Deflected sealing member 336, as shown, also includes one or more continuous or discontinuous ridges 341 that protrude outward from the sealing material into the cup and will contact a portion of the pulley, such as the annular wall 108, to form the contact seal 340. The ridge 341 generally makes the deflected sealing member self-deflecting. The ridge is shaped and/or angled such that when placed in contact with a portion of the pulley to form the contact seal the ridge is deflected toward the cup while remaining in contact with the pulley. As the sealing material wears away as a result of friction when the pulley rotates the sealing material will be biased toward the pulley to maintain contact therewith, thereby maintaining the contact seal and protecting the bearing from contaminants.

The cup 332 and the deflected sealing member 336 may be separable, as shown in FIG. 9. In an alternate embodiment, the deflected sealing member 336 may be integrally formed with or co-molded with the cup, for example, the sealing material may be over-molded onto the rim.

Figure 10:
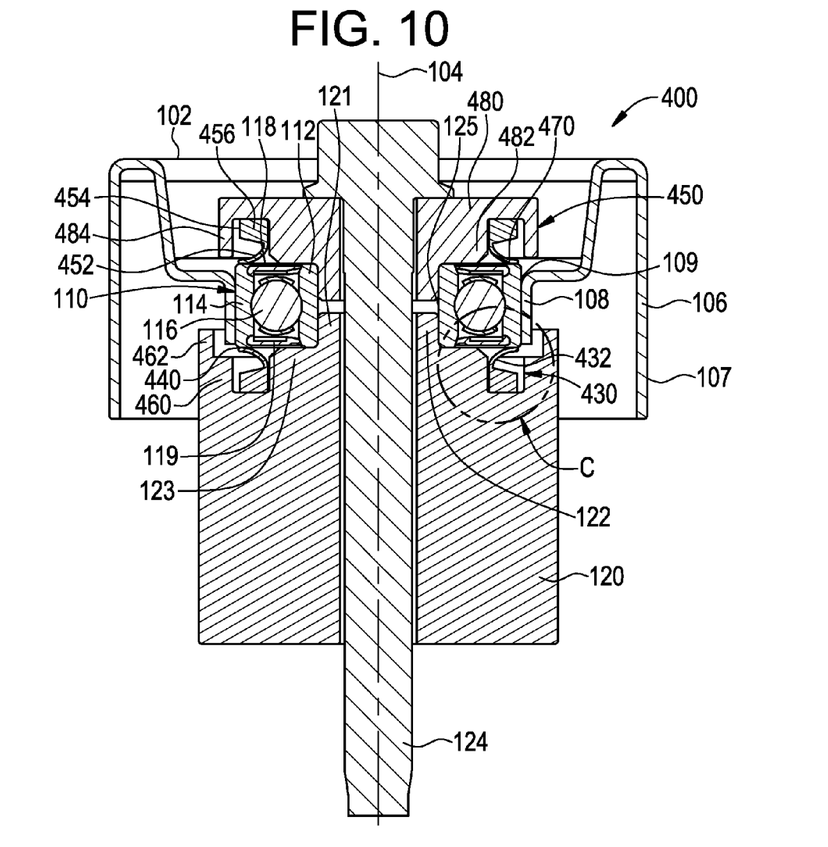
FIG. 10 is a front, cross-sectional view of a fourth embodiment of a pulley assembly.

Referring now to FIG. 10, a pulley assembly, generally designated 400, is shown that has an alternate embodiment for the first bearing shield, otherwise the other components and features are the same as FIGS. 1 and 3 with corresponding reference numbers. First bearing shield 430 forms a first contact seal 440 between the deflected sealing member 432 and the outer race 114 of bearing 110. Alternately, the deflected sealing member 432 may form the contact seal against the annular wall 108 or any other portion of the pulley shell, or either of these in combination with the outer race of the bearing.

Figure 11:
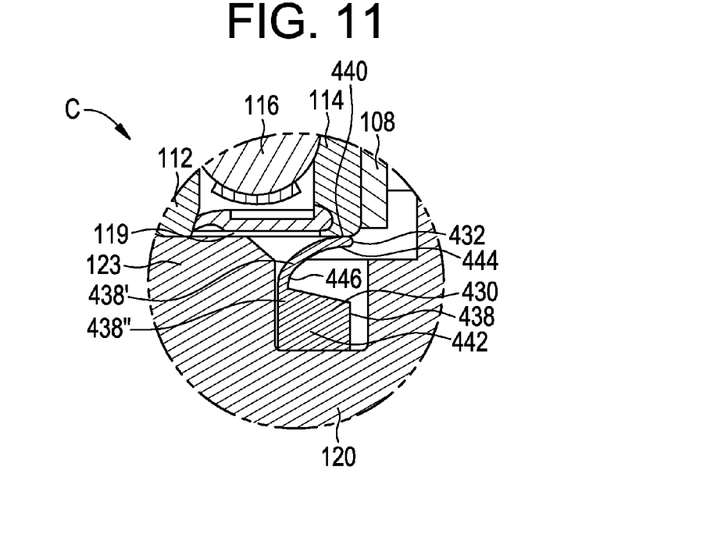
FIG. 11 is an enlarged view of a portion of the first bearing shield inside circle C of FIG. 10.

The first bearing shield 430 is a V-ring 438. V-ring 438 has a first side of the V 438' and a second side of the V 438" as labeled in the cross-section shown in FIG. 11. (FIG. 11 is the same as the portion of FIG. 10 shown in circle C except that the flange 460 and lip 462, described in more detail below, have been removed.) The deflected sealing member 438 is the first side of the V 438' and a spacer 442 is the second side of the V 438". The deflected sealing member 438 has a leading edge 444 and a trailing edge 446 and the spacer 442 is connected to the trailing edge 446. Within the assembled pulley assembly, spacer 442 positions the leading edge 444 above the upper surface of the mounting base 123. In this position the outer race of the bearing or a portion of the pulley shell presses the deflected sealing member toward the spacer to form the first contact seal 440. The deflected sealing member 438 may be deflected between 0.5 mm and 1.5 mm.

The V-ring 438 may have the deflected sealing member 432 at an angle of about 35° to about 55° relative to the spacer, pre-assembly. In one embodiment, the V-ring has an angle of 45° pre-assembly. V-rings are commercially available with various shapes, angles, and diameters. V-rings are generally made of elastomer without fabric or sheet metal reinforcement. They can be stretched and, depending on size, can be pushed over other components of the arrangement, e.g. mounting base 123. The V-ring is advantageous in that it is easily replaceable. Since the V-ring has a pre-assembly angle that is deflected during assembly, the deflecting sealing member is self-deflecting in that once the pulley is removed the deflecting sealing member will return to its original position.

Pulley receiving end 121, as shown in FIG. 10 may include a flange 460 that optionally includes lip 462 that surrounds the outer perimeter of the V-ring 438. Alternately, as shown in FIG. 11, V-ring 438 rests on a generally flat surfacer.

Pulley assembly 400 as shown in FIG. 10 may also include a second bearing shield 450 and a cap 480. The second bearing shield 450 may be any of the shields described herein or those known to one of skill in the art. FIG. 10 shows a first bearing shield 430 as a second V-ring 454. Second V-ring includes a deflected sealing material 452 and a spacer 456. Cap 480 includes a mounting base 482. Second bearing shield 450 seats against mounting base 482 and is disposed on the upper surface 118 of the bearing 110. The second V-ring 454 has a pre-assembly angle as described above and is deflected toward the spacer 456 when assembled. Cap 480 may optionally include a flange 484 that surrounds the outer perimeter of the second V-ring. When flange 484 is present it appears that second V-ring 454 is contained within a recess in cap 480. The recess may be larger than the second V-ring because the V-ring has a stretch fit over the mounting base and is stationary, i.e., second V-ring 454 does not rotate about the axis 104, does not translate along the axis or translate outward away from the axis. The same is true of V-ring 438.

In another aspect, a method for assembling any of the various embodiments of the pulley assemblies described above includes providing a pivot shaft 120 defining an axis of rotation 104, positioning a pulley 102 on the pivot shaft for rotation about the axis, positioning a first bearing shield, like bearing shield 130, 230, or, 330 over the lower surface of the bearing. Positioning the first bearing shield may include coaxially mounting the bearing shield between the bearing 110 and the pivot shaft 120 of the pulley assembly. The method may also include attaching the pulley and first bearing shield to the pivot shaft, which may include using fastener 124, as described above.

The method may include positioning a second bearing shield, like bearing shield 150, 250, or other available covers or seals, over the upper surface 118 of the bearing 110 and attaching the pulley and the first and second bearing shields to the pivot shaft. The second bearing shield may be positioned between the upper surface of the bearing and a portion of the fastener 124, such as the head of a pulley bolt.

In each of the embodiments described herein a deflected sealing member makes the contact seal with a part of the pulley, whether in contact with the outer race of the bearing or a portion of the pulley shell. The deflected sealing member is either deflected to form the contact seal by a component of the bearing shield, by other components of the pulley assembly, especially the pulley, is self-deflecting, or a combination thereof. The fact that the sealing member is deflected provides the advantage that as the sealing member gradually wears away as a result of friction with the pulley the sealing member will be biased toward the pulley to maintain the contact seal over the lifetime of the deflected sealing member, thus providing the bearing with improved protection from contaminants.

The embodiments of this invention shown in the drawings and described above are exemplary of numerous embodiments that may be made within the scope of the appended claims. It is contemplated that numerous other configurations of the pulley assemblies may be created taking advantage of the disclosed approach. In short, it is the applicant's intention that the scope of the patent issuing herefrom be limited only by the scope of the appended claims.

What is claimed is:

1. A pulley assembly comprising:
a pulley having an axis of rotation and comprising a pulley shell and a bearing, the pulley shell having an annular wall that defines an opening for housing the bearing, the bearing being in the opening, the bearing having an inner race, an outer race, and a rolling element therebetween;
a shaft having a pulley-receiving end that includes a mounting base; and
a first bearing shield disposed at the pulley-receiving end of the shaft, the first bearing shield comprising a plate and a deflected sealing member connected thereto, the deflected sealing member comprising a sealing material, the plate defining a spring bend that renders the plate self-deflecting in an unloaded state such that the plate biases and deflects at least a portion of the sealing material of the deflected sealing member against one of the outer race of the bearing and the inner race of the bearing to create a first contact seal to protect the bearing from contaminants, and the deflected sealing member includes a flange that extends in a direction generally parallel with the axis of rotation of the pulley and overhangs the annular wall of the pulley shell to create a labyrinth seal;
wherein the plate defines an opening to receive a portion of the pulley-receiving end of the shaft and at least a portion of the plate is sandwiched between the mounting base of the shaft and the inner race of the bearing;
wherein as the sealing material wears thinner as a result of friction, the first bearing shield continues to bias the deflected sealing member against at least one of the outer race of the bearing and the pulley shell.

2. The pulley assembly of claim 1, wherein the deflected sealing member is positioned about the outer periphery of the plate, and the flange extends from the outer periphery of the deflected sealing member generally in a direction away from the shaft.

3. The pulley assembly of claim 2 wherein the flange overhangs a portion of the pulley shell without contact thereagainst.

4. The pulley assembly of claim 1 wherein the plate and the deflected sealing member are integrally formed.

5. The pulley assembly of claim 1 wherein the deflected sealing member is a disc-shaped body of sealing material over-molded to the outer periphery of the plate.

6. The pulley assembly of claim 1 further comprising a second bearing shield disposed to protect the surface of the bearing opposite the first bearing shield.

\* \* \* \* \*